US007314384B2

(12) United States Patent
Togami et al.

(10) Patent No.: US 7,314,384 B2
(45) Date of Patent: Jan. 1, 2008

(54) ELECTRONIC MODULES HAVING AN INTEGRATED CONNECTOR DETACHMENT MECHANISM

(75) Inventors: Chris Kiyoshi Togami, San Jose, CA (US); Guy Newhouse, Fremont, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 11/555,121

(22) Filed: Oct. 31, 2006

(65) Prior Publication Data

US 2007/0059953 A1 Mar. 15, 2007

Related U.S. Application Data

(63) Continuation-in-part of application No. 10/776,430, filed on Feb. 11, 2004, now Pat. No. 7,186,134, which is a continuation-in-part of application No. 10/389,509, filed on Mar. 14, 2003, now Pat. No. 7,066,746, which is a continuation of application No. 10/075,835, filed on Feb. 12, 2002, now Pat. No. 6,533,603, which is a continuation-in-part of application No. 09/971,885, filed on Oct. 4, 2001, now Pat. No. 6,439,918.

(51) Int. Cl.
*H01R 13/00* (2006.01)

(52) U.S. Cl. ...................................... 439/484; 439/160

(58) Field of Classification Search ................ 439/484, 439/676, 160

See application file for complete search history.

(56) References Cited

U.S. PATENT DOCUMENTS 4,083,619 A 4/1978 McCormick et al.
4,387,956 A 6/1983 Cline
4,678,264 A 7/1987 Bowen et al.
4,703,989 A * 11/1987 Price et al. ................. 439/676
4,798,430 A 1/1989 Johnson et al.
4,993,803 A 2/1991 Suverison et al.
4,995,821 A 2/1991 Casey (Continued)

FOREIGN PATENT DOCUMENTS

DE 20005316 9/2000

(Continued)

OTHER PUBLICATIONS

Article Titled “Fiber Optic Module Interface Attachment,” Oct. 1991, C. Baldwin, Published by Kenneth Mason Publication Ltd, England.

(Continued)

*Primary Examiner*—Briggitte R. Hammond
(74) *Attorney, Agent, or Firm*—Workman Nydegger

(57) ABSTRACT

Embodiments of the invention are concerned with optical and electrical transceiver modules and, more specifically, to transceiver modules having an integrated cable detachment mechanism. In one example embodiment, a transceiver module includes a housing, a connector receptacle disposed within the housing, and a transfer mechanism connected to the housing. In this example embodiment, the connector receptacle is configured to receive a cable connector having a hood which partially encloses a detachment clip of the cable connector. Also in this example embodiment, the transfer mechanism is disposed such that when the cable connector is received within the connector receptacle, at least a portion of the transfer mechanism extends between the hood and the detachment clip of the cable connector.

27 Claims, 12 Drawing Sheets

U.S. PATENT DOCUMENTS 5,021,003 A 6/1991 Ohtaka et al.
5,039,194 A 8/1991 Block et al.
5,069,522 A 12/1991 Block et al.
5,071,219 A 12/1991 Yurtin et al.
5,195,897 A 3/1993 Kent et al.
5,202,943 A 4/1993 Carden et al.
5,256,080 A 10/1993 Bright
5,329,428 A 7/1994 Block et al.
5,416,871 A 5/1995 Takahashi et al.
5,487,678 A 1/1996 Tsuji et al.
5,528,408 A 6/1996 McGinley et al.
5,546,281 A 8/1996 Poplawski et al.
5,561,727 A 10/1996 Akita et al.
5,596,665 A 1/1997 Kurashima et al.
5,600,885 A * 2/1997 Schroepfer et al. ......... 439/606
5,734,558 A 3/1998 Poplawski et al.
5,738,538 A 4/1998 Bruch et al.
5,767,999 A 6/1998 Kayner
5,820,398 A 10/1998 Stabroth et al.
5,879,173 A 3/1999 Poplawski et al.
5,901,263 A 5/1999 Gaio et al.
5,931,290 A 8/1999 Wehrli, III et al.
5,947,435 A 9/1999 Small
5,980,324 A 11/1999 Berg et al.
6,050,658 A 4/2000 O'Sullivan et al.
6,069,991 A 5/2000 Hibbs-Brenner et al.
6,074,228 A 6/2000 Berg et al.
6,081,431 A 6/2000 Lemke
6,088,498 A 7/2000 Hibbs-Brenner et al.
6,101,087 A 8/2000 Sutton et al.
6,142,802 A 11/2000 Berg et al.
6,142,828 A 11/2000 Pepe
6,149,465 A 11/2000 Berg et al.
6,169,295 B1 1/2001 Koo
6,179,627 B1 1/2001 Daly et al.
6,229,708 B1 5/2001 Corbin, Jr. et al.
6,231,145 B1 5/2001 Liu
6,259,769 B1 7/2001 Page et al.
6,299,362 B1 10/2001 Gilliland et al.
6,350,063 B1 2/2002 Gilliland et al.
6,371,787 B1 4/2002 Branch et al.
6,430,053 B1 8/2002 Peterson et al.
6,434,015 B1 8/2002 Hwang
6,439,918 B1 8/2002 Togami et al.
6,485,322 B1 11/2002 Branch et al.
6,494,623 B1 12/2002 Ahrens et al.
6,517,382 B2 2/2003 Flickinger et al.
6,524,134 B2 2/2003 Flickinger et al.
6,532,155 B2 3/2003 Green et al.
6,533,603 B1 3/2003 Togami
6,538,882 B2 3/2003 Branch et al.
6,544,055 B1 4/2003 Branch et al.
6,556,445 B2 4/2003 Medina
6,570,768 B2 5/2003 Medina
6,692,159 B2 2/2004 Chiu et al.
6,746,264 B1 6/2004 Branch et al.
6,881,095 B2 4/2005 Murr et al.
6,887,092 B2 5/2005 Minota
2002/0142649 A1 10/2002 Baugh et al.
2002/0150353 A1 10/2002 Chiu et al.
2003/0020986 A1 1/2003 Pang et al.
2003/0044129 A1 3/2003 Ahrens et al.
2003/0059167 A1 3/2003 Chiu et al.
2003/0100204 A1 5/2003 Hwang

FOREIGN PATENT DOCUMENTS

EP 0456298 11/1991
EP 0442608 1/2001
GB 2297007 7/1996
JP 4165312 6/1992

OTHER PUBLICATIONS

Article Titled "Field Replaceable Optical Link Card," Feb. 1994, IBM, pp. 47-49.
Article Titled "Small Form Factor Pluggable (SFP) Transceiver Multisource Agreement (MSA)," Agilent Technologies et al., Sep. 14, 2000, pp. 1-38.
Article Titled "CD Laser Optical Data Links for Workstations and Midrange Computers," Ronald L. Soderstrom et al., IBM Business Systems, 5pgs.
Article Titled "Optical Link Card Guide/Retention System," Block, et al., *Research Disclosure*, Kenneth Mason Publications Ltd., Apr. 1993, No. 348.
Article Titled "Package for Electrical and Optical Components of Communications Port of Data Processing System," Jarvela, *IBM Technical Disclosure Bulletin*, Jan. 1985, vol. 27, No. 8.
Article Titled "XFP (10 Gigabit Small Form Factor Pluggable Module)," Ghiasi, et al., XFP MSA, 2002.
US 6,554,622, 04/2003, Engel et al. (withdrawn)

* cited by examiner

ELECTRONIC MODULES HAVING AN INTEGRATED CONNECTOR DETACHMENT MECHANISM

CROSS-REFERENCE TO RELATED APPLICATIONS

This application is a continuation-in-part of U.S. patent application Ser. No. 10/776,430, filed on Feb. 11, 2004 now U.S. Pat. No. 7,186,134, which is a continuation-in-part of U.S. patent application Ser. No. 10/389,509, filed on Mar. 14, 2003 now U.S. Pat. No. 7,066,746, which is a continuation of U.S. patent application Ser. No. 10/075,835, filed Feb. 12, 2002, now U.S. Pat. No. 6,533,603, which is a continuation-in-part of application Ser. No. 09/971,885, filed Oct. 4, 2001, now U.S. Pat. No. 6,439,918. Each of the aforementioned patents and applications is incorporated herein by reference in its entirety.

BACKGROUND OF THE INVENTION

1. The Field of the Invention

This invention relates to optical and electrical transceiver modules and, more specifically, to transceiver modules having an integrated connector detachment mechanism.

2. Related Technology

Fiber optics are increasingly used for transmitting voice and data signals. As a transmission medium, light provides a number of advantages over traditional electrical communication techniques. For example, light signals allow for extremely high transmission rates and very high bandwidth capabilities. Also, light signals are resistant to electromagnetic interferences that would otherwise interfere with electrical signals. Light also provides a more secure signal because it doesn't allow portions of the signal to escape from the fiber optic cable as can occur with electrical signals in wire-based systems. Light also can be conducted over greater distances without the signal loss typically associated with electrical signals on copper wire.

While optical communications provide a number of advantages, the use of light as a transmission medium presents a number of implementation challenges. In particular, the data carried by a light signal must be converted to an electrical format when received by a device, such as a network switch. Conversely, when data is transmitted to the optical network, it must be converted from an electronic signal to a light signal. A number of protocols define the conversion of electrical signals to optical signals and transmission of those optical, including the ANSI Fiber Channel (FC) protocol. The FC protocol is typically implemented using a transceiver module at both ends of a fiber optic cable. Each transceiver module typically contains a laser transmitter circuit capable of converting electrical signals to optical signals, and an optical receiver capable of converting received optical signals back into electrical signals.

Typically, a transceiver module is electrically interfaced with a host device—such as a host computer, switching hub, network router, switch box, computer I/O and the like—via a compatible connection port. Moreover, in some applications, it is desirable to miniaturize the physical size of the transceiver module to increase the port density, i.e., to accommodate a higher number of network connections within a given physical space. In addition, in many applications, it is desirable for the module to be hot-pluggable, which permits the module to be inserted and removed from the host system without removing electrical power. To accomplish many of these objectives, international and industry standards have been adopted that define the physical size and shape of optical transceiver modules to ensure compatibility between different manufacturers. For example, in 1998, a group of optical manufacturers developed a set of standards for optical transceiver modules called the Small Form-factor Pluggable ("SFP") Transceiver MultiSource Agreement ("MSA"). In addition to the details of the electrical interface, this standard defines the physical size and shape for the SFP transceiver modules, and the corresponding host port, so as to insure interoperability between different manufacturers' products. The standard also specifies that the module be hot-pluggable. To do so, the standard specifies that a user provide a minimum amount of space between host ports, so that transceiver modules can be individually accessed and removed from the host device without disturbing the adjacent modules and/or cable connections.

While such standards may recommend that there be a minimum distance between adjacent ports, there is often a desire to provide configurations having a higher port density. However, providing a high port density can be at odds with the ability to provide a module that complies with existing standards—i.e., that has a small form-factor and is hot-pluggable. In particular, previously existing module designs present a size and profile that mandates that a specific minimum amount of space be provided between host ports so that individual modules can be accessed and removed without disturbing an adjacent module and/or an adjacent fiber cable. Such modules either cannot be used in a device having a high port density (due to the space requirements), or, if used in such an environment, require the use of a special extraction tool to allow for access and retrieval of a module without disturbing adjacent modules and/or cables. Use of an extraction tool is often not desirable because it raises costs, the tool can be misplaced, and/or it may not be compatible with other module designs.

In addition, transceiver modules are sometimes used in connection with hooded cable connectors. Hooded cable connectors are equipped with a hood to protect a portion of a detachment clip of the hooded cable connector. The detachment clip engages the transceiver module and maintains the connection of the cable connector to the transceiver module. In order to disengage the detachment clip from the transceiver module and thereby disconnect the cable connector from the transceiver module, the detachment clip must be depressed. However, direct access to the detachment clip is prevented by the hood. The outside of the hood must be pressed down until the inside of the hood makes contact with the detachment clip in order to indirectly access the detachment clip. The hood can then be depressed further until the detachment clip is depressed far enough to disengage the transceiver module. It can sometimes be difficult to depress the hood the distance necessary to disengage the detachment clip from the transceiver module.

BRIEF SUMMARY OF EXAMPLE EMBODIMENTS

In general, embodiments of the invention are concerned with optical and electrical transceiver modules and, more specifically, to transceiver modules having an integrated connector detachment mechanism.

In one example embodiment, a transceiver module includes a housing, a connector receptacle at least partially disposed within the housing, and a transfer mechanism connected to the housing. In this example embodiment, the connector receptacle is configured to receive a cable connector having a hood which partially encloses a detachment clip of the cable connector. Also in this example embodiment, the transfer mechanism is disposed such that when the cable connector is received within the connector receptacle, at least a portion of the transfer mechanism extends between the hood and the detachment clip of the cable connector.

In another example embodiment, an electrical transceiver module includes a housing, an electrical connector receptacle at least partially disposed within the housing, and a bail connected to the housing. In this example embodiment, the electrical connector receptacle is configured to receive an electrical cable connector having a hood which partially encloses a detachment clip of the electrical cable connector. Also in this example embodiment, the bail is disposed such that when the electrical cable connector is received within the electrical connector receptacle, at least a portion of the bail extends between the hood and the detachment clip of the electrical cable connector.

These and other aspects of exemplary embodiments of the present invention will become more fully apparent from the following description and appended claims.

BRIEF DESCRIPTION OF THE DRAWINGS

To further clarify the above and other aspects of example embodiments of the present invention, a more particular description of these examples will be rendered by reference to specific embodiments thereof which are illustrated in the appended drawings. It is appreciated that these drawings depict only example embodiments of the invention and are therefore not to be considered limiting of its scope. The example embodiments of the invention will be described and explained with additional specificity and detail through the use of the accompanying drawings in which.

DETAILED DESCRIPTION OF EXAMPLE EMBODIMENTS

Reference will now be made to the drawings to describe presently preferred embodiments of the invention. It is to be understood that the drawings are diagrammatic and schematic representations of the presently preferred embodiments, and are not limiting of the present invention, nor are they necessarily drawn to scale.

In general, the present invention relates to an electronic module, such as an optical transceiver module, that utilizes a unique integrated latch system to releasably secure the transceiver module within a host slot or port. Moreover, the latch system can be implemented within a transceiver module having a low profile. The module substantially complies with existing industry standards, such as those specified in the SFP Transceiver MSA. The latch system permits easy extraction and insertion of the module by a user, even when it is used in a host system having a high-density port configuration, i.e., when the modules are disposed in ports immediately adjacent to one another in one or both lateral dimensions. Further, extraction can be accomplished without the use of a specialized extraction tool, and can be done without disturbing adjacent modules and cables.

Also, while embodiments of the present invention are described in the context of optical transceiver modules used in the field of optical networking, it will be appreciated that the teachings of the present invention are applicable to other applications as well. For example, other types of pluggable electronic modules, both electronic and opto-electronic, could utilize embodiments of the latch system to facilitate insertion and extraction from a corresponding host port.

Figure 7:
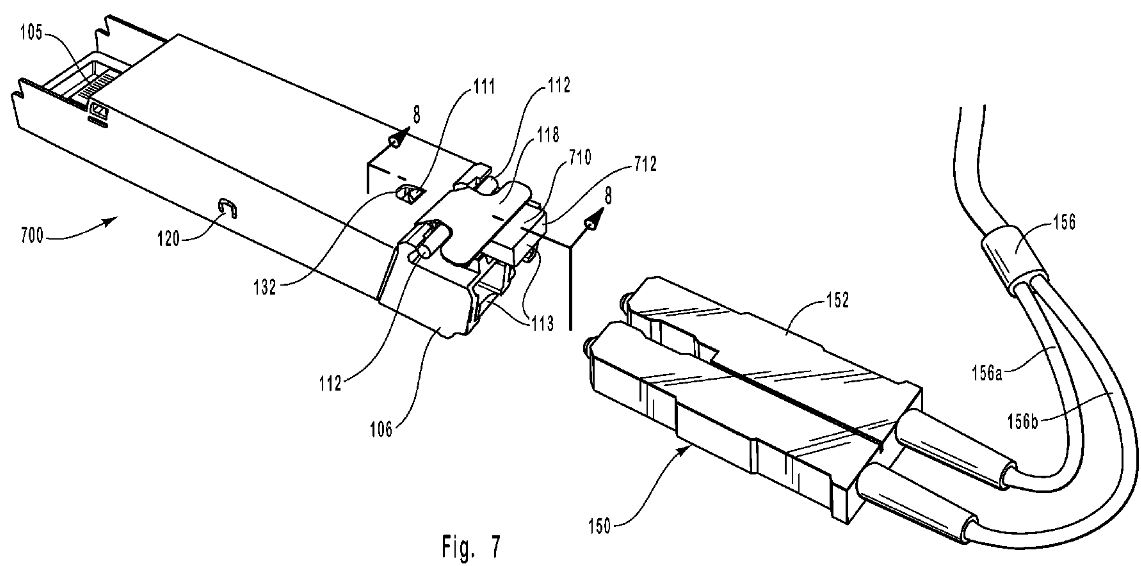
FIG. 7 is an exploded perspective view of yet another exemplary embodiment of a transceiver module having an integrated latch system.
Figure 8:
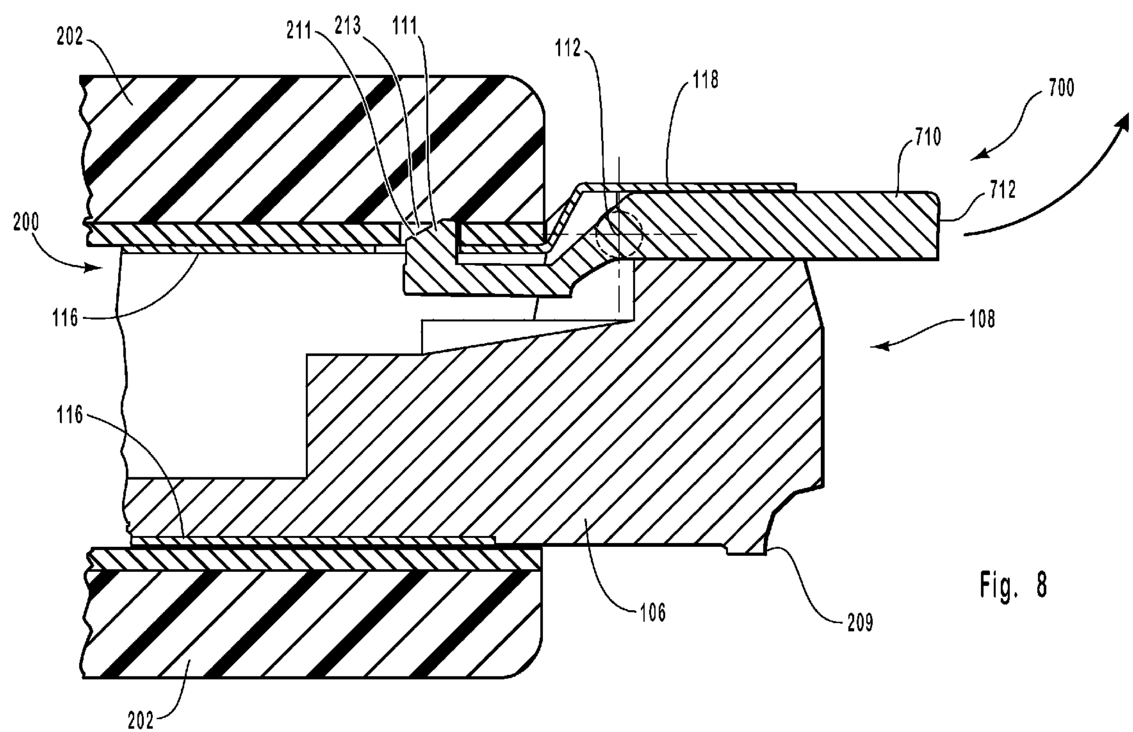
FIG. 8 is a cross sectional view of the transceiver module taken along lines 8-8 in FIG. 7 that shows a close-up view of the latch system in the latched position.
Figure 9:
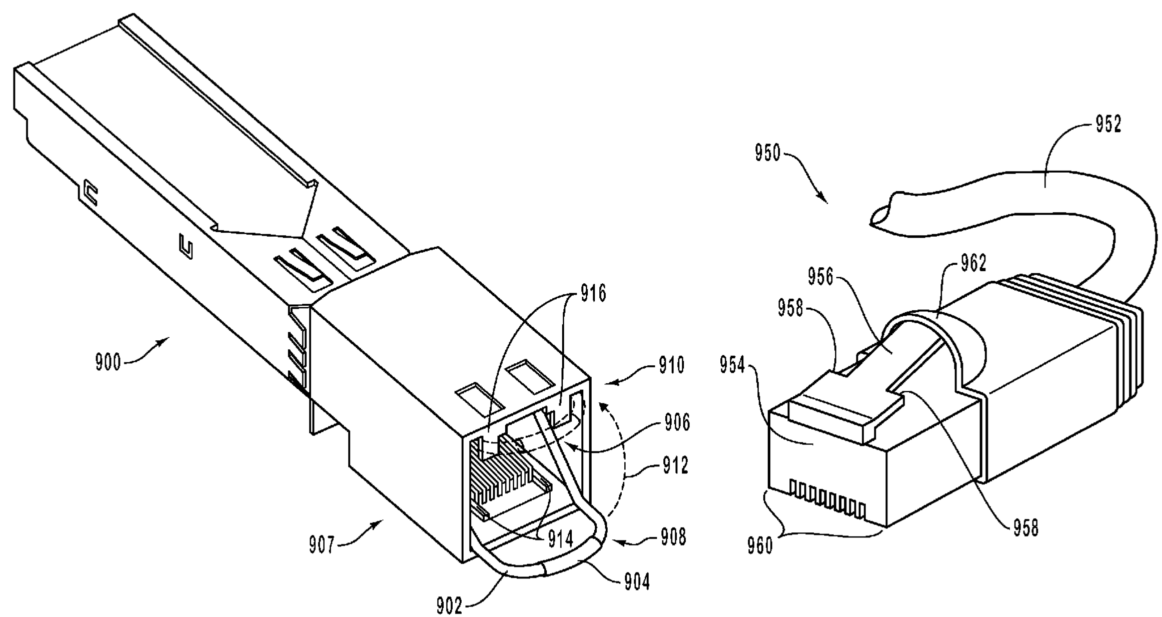
FIG. 9 is a perspective view of an assembled version of an electrical transceiver module and latch system and a hooded cable connector.
Figure 10:
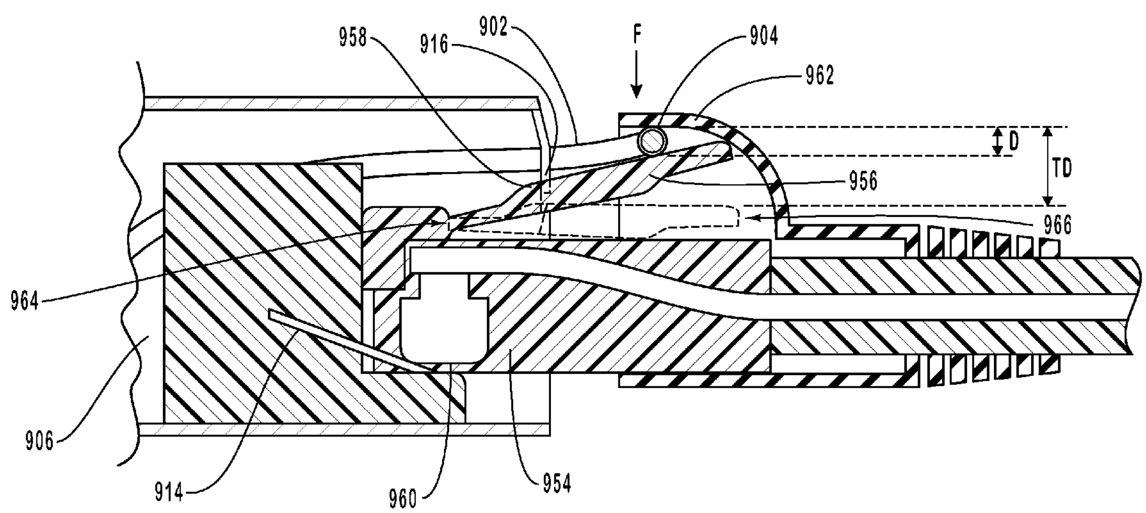
FIG. 10 is a cross section view of the hooded cable connector of FIG. 9 plugged into the electrical transceiver module of FIG. 9.

FIGS. 1-6 and the accompanying text relate to a latching mechanism that uses a bail to enable the user to manipulate the latch. FIGS. 7 and 8 and the accompanying text relate to another latching mechanism that does not include a bail and is manipulated by users who directly exert force on a lever, typically with a thumb or finger. While both of these embodiments are illustrated, the principles associated with the bail embodiment of FIGS. 1-6 are generally also applicable to the embodiment of FIGS. 7 and 8 that does not include a bail. In addition, the embodiment of FIGS. 7 and 8 provides the additional benefit of further reducing the space requirements associated with the latching mechanism. FIGS. 9 and 10 and the accompanying text relate to the interaction between a latching mechanism in an electrical transceiver module and a hooded cable connector.

I. Embodiments Using a Bail to Manipulate Latching Mechanism

Figure 1:
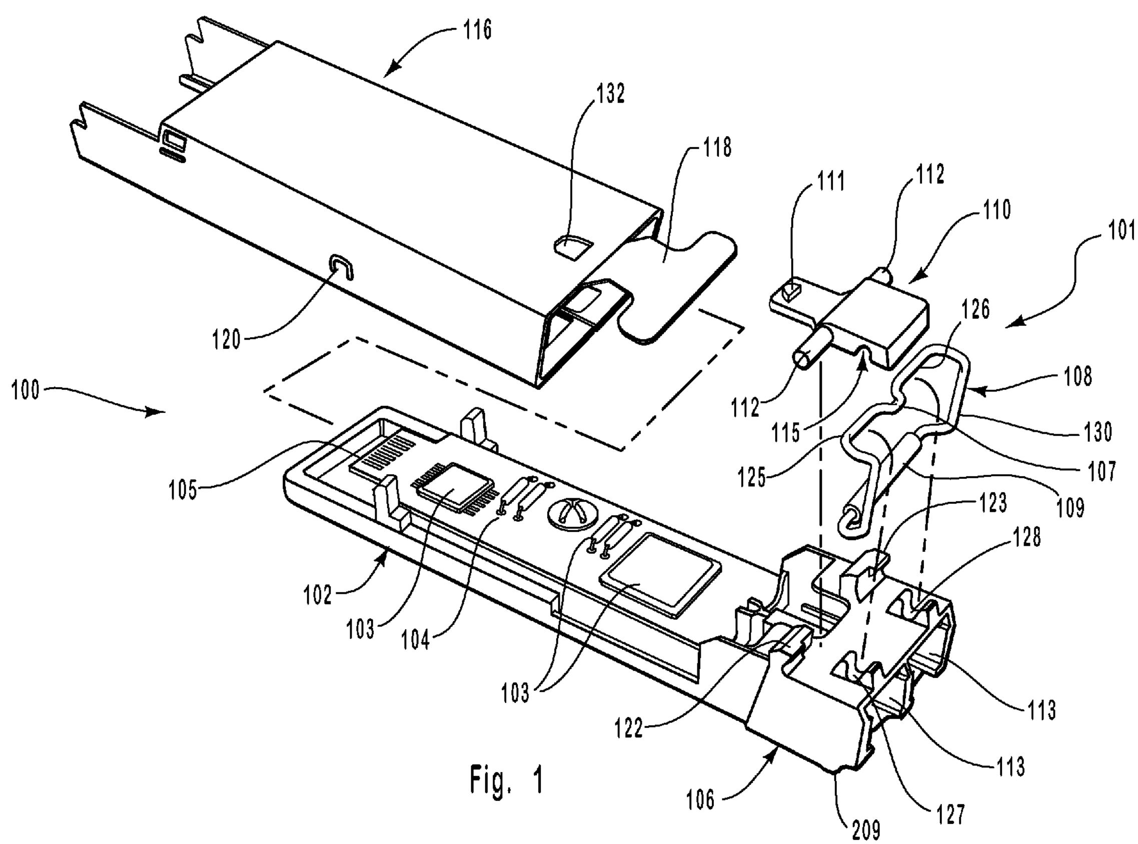
FIG. 1 illustrates an exploded perspective view of one exemplary embodiment of a transceiver module having an integrated latch system.
Figure 2:
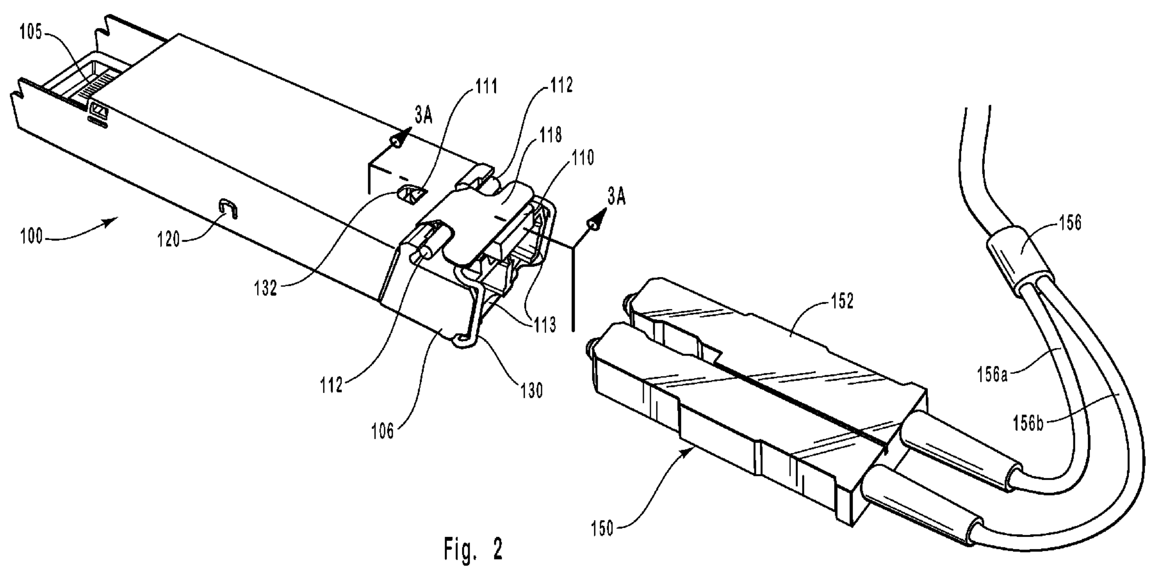
FIG. 2 is a perspective view of an assembled version of the transceiver module and latch system shown in FIG. 1 and a corresponding exemplary modular fiber cable connector and fiber cable assembly.

Reference is first made to FIGS. 1 and 2 together, which illustrate perspective views of one exemplary embodiment of an optical transceiver module, designated generally at 100. In the illustrated example, the module 100 is comprised of an elongate base portion, designated generally at 102, that is configured to support and retain a printed circuit board 104. In this example, the circuit board accommodates the transceiver electronics 103 and optics (not shown), although it could be comprised of any circuitry or components depending on the type of module being used. Also formed on the printed circuit board 104 at a rear end is an exposed edge connector 105. The edge connector 105 is configured to be electrically compatible with a corresponding electrical connector (not shown) that is positioned within the port of a host device. Other connector schemes that are well known in the art could also be used.

In the illustrated embodiment, a connector portion, designated generally at 106, is positioned at one end of the base portion 102. The connector portion 106 defines a receptacle configuration 113 that operatively receives a corresponding modular fiber connector configuration, such as is typically used to interface with an optical fiber cable. One example of such a fiber connector and cable configuration is shown at 150 in FIG. 2. Alternately, a wired cable could be used in a similar module in place of the optical fiber cable. It will be appreciated that the receptacle could be implemented to accommodate any one of a number of different connector configurations, depending on the particular application involved.

As is further shown in FIGS. 1 and 2, the module 100 further includes a latching mechanism, designated generally at 101. In one exemplary embodiment, the latch mechanism 101 provides several functions. First, the latch mechanism 101 provides a mechanism for "latching" the module 100 within a host port, represented at 200 in FIGS. 3A and 3B, when the module 100 is operatively received within the port 200. Moreover, as will also be described in further detail, the latch mechanism 101 also provides a convenient means for extracting the module 100 from the port 200, without the need for a special extraction tool. The latching mechanism is preferably implemented so as to substantially preserve the small form factor of the module 100 in accordance with prevailing standards, and in a manner that allows convenient insertion and extraction of a single module without disturbing adjacent modules or adjacent fiber cables—even when used in a host having a high port density. Also, in an exemplary embodiment, the latch mechanism precludes inadvertent extraction of the module 100 from the port when a modular fiber connector 150 is operatively received within the receptacle 113.

By way of example and not limitation, in an exemplary embodiment, the latch mechanism 101 includes user accessible means for selectively latching the module 100 within a host port, and for extracting the module from the port. By way of example and not limitation, user accessible means can be comprised of a bail, designated generally at 108. Preferably, the bail 108 has a main body portion 130 formed from a rigid metal wire. While the bail 108 could be configured in any one of a number of shapes, in a preferred embodiment the bail 108 is sized and shaped so as to be accessible with a user's finger, or any other common implement, such as a pen or the like. Also, the bail 108 is shaped so as to conform substantially with the shape of the module 100 when the bail is placed in a "latched" position, as is represented in FIG. 2. In this way, the bail does not violate the overall low profile presented by the module 100. Also, in one embodiment, the bail 108 includes a grip or clasp 109 that is formed of a material that allows for easier access and gripping by a user's finger. The clasp 109 can be formed any number of ways, including a cylindrical piece that slides over the bail wire, or alternatively, it could be formed by using an overmold process.

In a preferred embodiment, the bail 108 includes a cam 107 that facilitates the latching and unlatching of the module within the port. FIG. 1 illustrates how the cam 107 is provided with a bend formed along a portion of the main body of the bail 108 between two shoulder portions 125 and 126. It will be appreciated that the cam could be implemented along the length of the bail 108 using other techniques. Operation of the bail 108 and cam 107 will be discussed in further detail below.

Figure 1A:
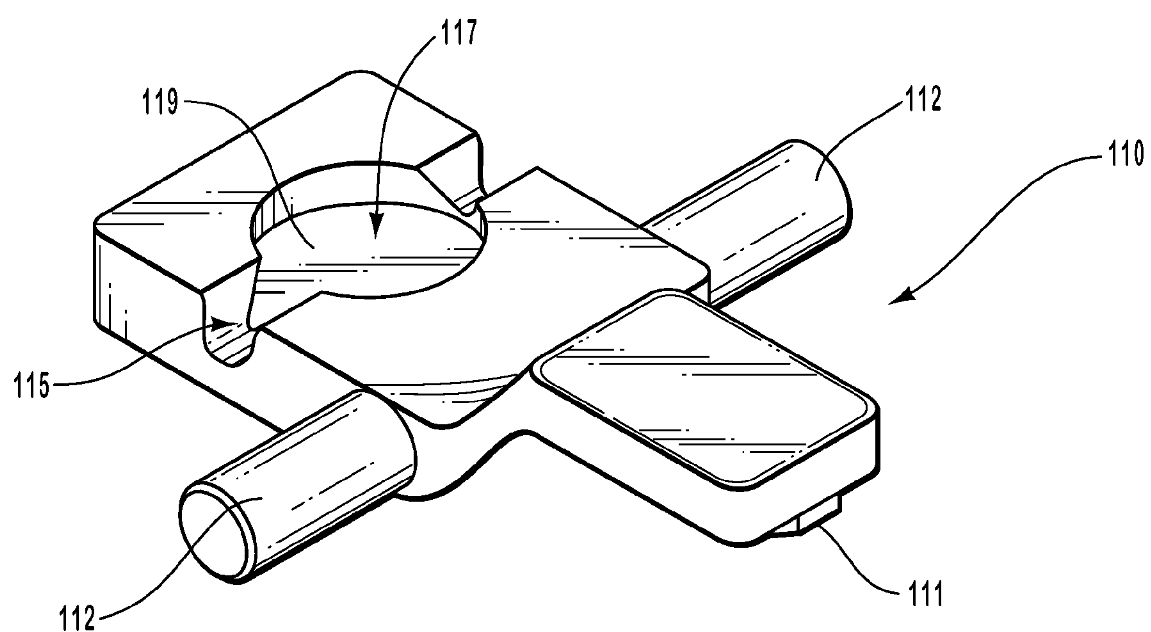
FIG. 1A is a perspective view of the bottom side of the pivot block portion of the latch system of FIG. 1.

Making continued reference to FIGS. 1, 1A and 2, formed along the top surface of the connector portion 106 is a retention mechanism for operatively receiving the bail 108. In the embodiment illustrated in FIG. 1, the retention mechanism is comprised of dual retention slots 127 and 128 that are each sized and shaped to receive the corresponding shoulder portions 125, 126 of the bail 108 when the latching system 101 is assembled. In operation of the latching mechanism 101, the retention slots 127, 128 permit rotation of the bail at the shoulder portions 125, 126. Of course, the retention mechanism could be implemented in a number of different ways. For example, a single retention slot may suffice, or different geometries could be used.

In the illustrated embodiment, the bail 108 is operatively secured to the module 100 by way of an overlying pivot block, designated generally at 110. FIGS. 1 and 1A show how the pivot block 110 includes a pivot recess 115 that accommodates the shoulder portions 125, 126 and the cam portion 107 when the pivot block 110 is disposed on the top surface of the connector block 106 between the retention slots 127 and 128. As is shown in FIG. 1A, which illustrates the bottom of the pivot block 110, the pivot recess 115 preferably includes an enlarged portion 117 that is capable of operatively accommodating the cam portion 107 when the cam 107 is disposed in a horizontal orientation within the enlarged portion 117. Again, the pivot recess 115 and the enlarged portion 117 secure the bail 108 to the module 100 in cooperation with the retention slots 127 and 128, but do so in a manner so as to permit rotation of the bail 108 during operation of the latching mechanism. Rotation of the bail 108 causes the cam portion 107 to operatively engage a cam follower surface 119 formed on the pivot block 110 within portion 117. This is discussed further below.

FIGS. 1 and 1A illustrate how the pivot block 110 also includes a pivot arm 112 disposed along a pivot axis of the block 110. When mounted on the top surface of the connector portion 106 of base 102, each end of the pivot arm 112 is rotatably held within pivot points 122 and 123 that are each formed on the top surface of the connector portion 106. In an exemplary embodiment, the latching mechanism further includes means for latching the module 100 within a port slot. This latching means is provided by way of a lock pin 111 formed along the top surface of a pivot end of the block 110. The pin 111 is preferably formed as a wedge having a leading edge 211 (FIG. 3A) that is sloped or otherwise appropriately shaped, so as to facilitate insertion of the module 100 into the host port.

FIGS. 1 and 2 also illustrate how the base portion 102 and the printed circuit board 104 are at least partially enclosed and retained within an outer housing, designated generally at 116. The outer housing 116 is generally rectangular in cross-sectional shape so as to accommodate the base portion 102. The housing 116 includes an opening at its rear end so as to expose the edge connector 105 and thereby permit it to be operatively received within a corresponding electrical connector slot (not shown) within the host port 200 (see FIGS. 3A and 3B). The housing 116 can be formed of any appropriate material and in one exemplary embodiment is made of sheet metal.

In an exemplary embodiment, the housing 116 is also configured so as to provide a portion of the module's latching mechanism 101. For example, the top surface of the housing includes a locking recess 132, which is sized and shaped to expose the lock pin 111 of the pivot block 110 when the latch mechanism is in a latched position, as will be described below. Also, the housing 116 includes a means for biasing the latching mechanism to a latched position. By way of example, in one exemplary embodiment, the biasing means is a resilient metal portion of the housing that is formed as a leaf spring 118. When assembled (FIG. 2), the leaf spring 118 is biased against the top surface of the pivot block 110 so as to operatively secure it in its assembled position. Also, the biasing action is applied so as to urge the pivot block 110 in a rotational direction about pivot point 112 so as to expose lock pin 111 through locking recess 132. This corresponds to the module being in a latched position.

Figure 3A:
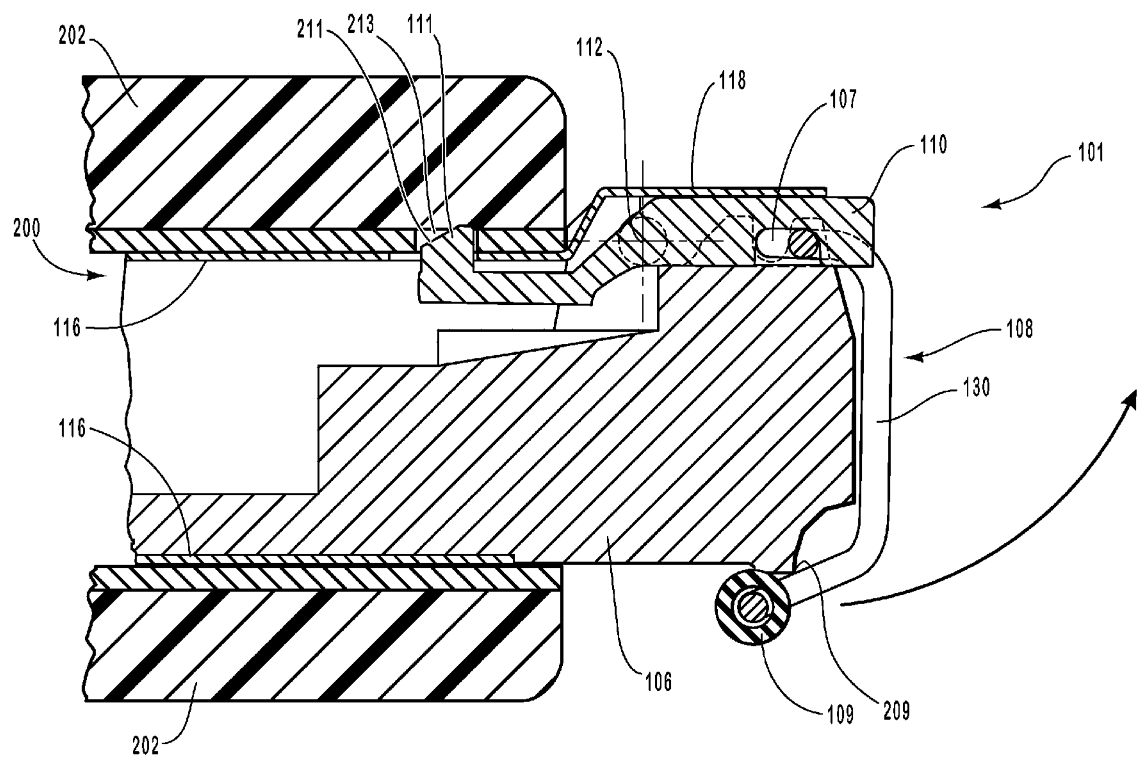
FIG. 3*a* is a cross sectional view of the transceiver module taken along lines 3-3 in FIG. 2 that shows a latch system in the latched position.
Figure 3B:
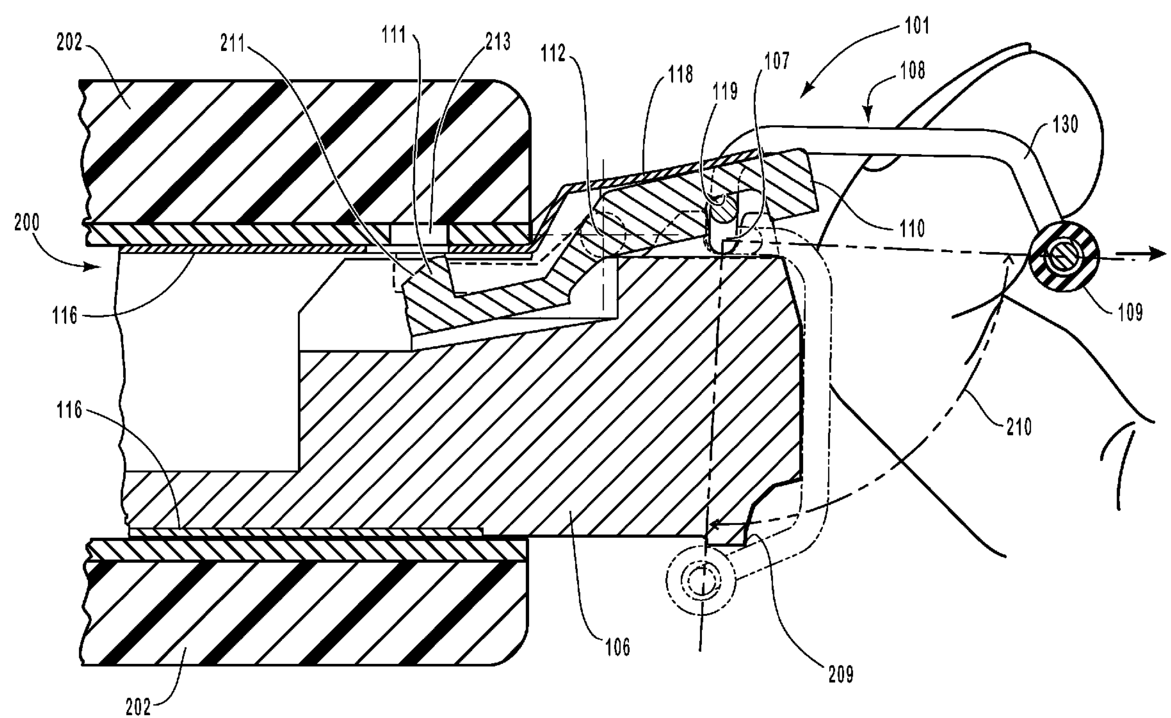
FIG. 3*b* is a cross sectional view of the transceiver module taken along lines 3-3 in FIG. 2 that shows a latch system in the unlatched position.

Reference is next made to FIGS. 3A and 3B, which together illustrate the various exemplary operating characteristics of the module 100 and its latching mechanism 101. As noted, the transceiver module 100 is capable of being operatively received within an appropriate port, such as is represented at 200 of FIGS. 3A and 3B, of a host system, a portion of which is represented at 202. When operatively received within the port 200, the edge connector 105 (FIG. 2) is received within a corresponding electrical connector (not shown) disposed within the port 200, so as to provide the requisite electrical interface between the transceiver module 100 and the host 202. Also, at this point, the modular cable connector 150 (FIG. 2) of the optical cable 156 can be received within the receptacle 113 of the connector portion 106.

In general, the relative position of the bail 108 governs the operational state of the latching mechanism 101. When placed in a latched position, the module 100 is securely retained within a host port 200. In an unlatched position, the module 100 can be removed from the host port 200. For example, in the latched position, the position of the bail 108 is rotated and placed in a downward direction, as is shown in FIG. 2 and FIG. 3A. Note that the term "downward" is arbitrary, as the module functions in any spatial orientation within an appropriately configured port. In this position, the cam portion 107 of the bail 108 is horizontally disposed within the enlarged portion 117 of the cam follower surface 119 of the pivot recess 115 and is thus not exerting any cam force against the pivot block 110. As such, the leaf spring 118 is biased against the top surface of the pivot block 110 at a point that urges the pivot block 110 in a rotational direction about pivot point 112 so as to expose lock pin 111 though locking recess 132. This lock pin 111 is then able to engage with a corresponding notch or recess 213 formed within the port 200 of the host 202. This engagement effectively "latches" the module 100 within the port 202.

In a preferred embodiment, the shape and configuration of the bail 108 also allow the cable connector 150 to be received within the modular receptacle 113 when the bail 108 is placed in this latched position. As noted, in this position the bail 108 does not violate the small profile presented by the module 100. To this end, embodiments may include an over center lock, or nub 209, provided on a lower edge of the connector portion 106. When placed in the latched position, the clasp 109 snaps over the nub 209 and is retained in that position until disengaged by the user.

The bail 108 is rotated upwardly, as is indicated by the directional arrow in FIG. 3A, to place the latch mechanism 101 into an "unlatched" position, shown in FIG. 3B. Note that this upward rotation of the bail 108 sweeps out an imaginary pie piece-shaped volume 210, which is seen edge-on in FIG. 3B. When the bail 108 is rotated upwardly, the cam portion 107 is rotated to a vertical orientation within enlarged recess portion 117. Because the height of the recess portion 117 is less than that of the vertically extended cam, rotation of the cam 107 exerts an upward force on the cam follower surface 119 of the pivot block 110 formed within the recess portion 117. The force of the cam 107 against the cam follower surface 119 provided on the pivot block overcomes the biasing action provided by the leaf spring 118 and causes the pivot block 110 to pivot in the opposite direction about axis 112. This lowers the pivot lock pin 111 so that it is disengaged from the notch 213 formed within the host port 200. In this unlatched state, the user, by pulling on the lever formed by the bail 108, can remove the module 100 from the port, as is represented in FIG. 3B. Since the bail 108 extends out in front of the module 100, extraction can be accomplished without having to grip the sides of the module, and without disturbing and/or otherwise inadvertently affecting the connection status of an adjacent module or fiber cable. Also, the shape and configuration of the bail 108 insures that it cannot be rotated to the unlatched position while a connector 150 is disposed within the modular receptacle 113. This prevents accidental removal of the module 100 from the port by inadvertently pulling on the connector 150 or cable 156.

Figure 4:
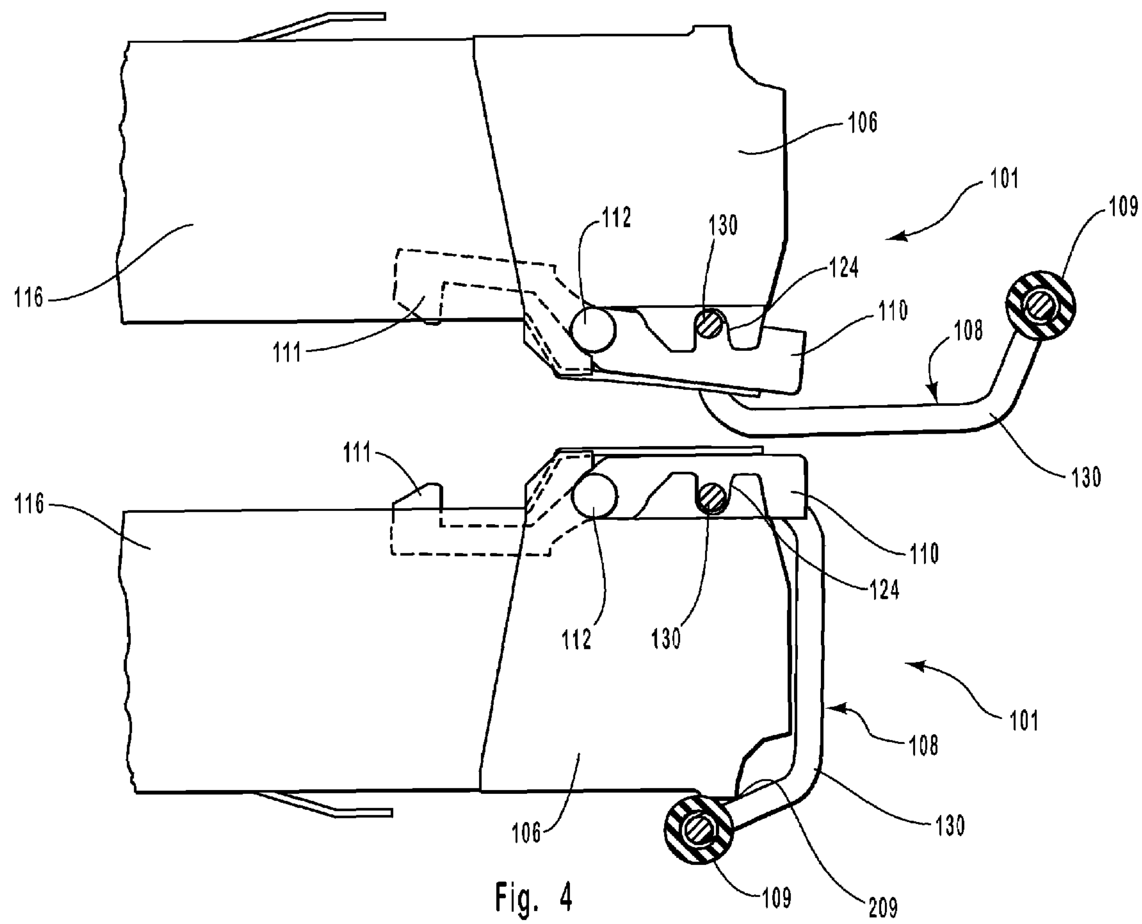
FIG. 4 is a side view of two adjacent transceiver modules with corresponding latch systems in different operational positions.

FIG. 4 illustrates a profile view of two immediately adjacent transceiver modules, placed in what is sometimes referred to as a "belly-to-belly" configuration. This might correspond to a port configuration in a host device having a high port density. The disclosed latching mechanism allows this physical orientation and still permits retraction of one module without disturbing an adjacent module, or the cable of an adjacent module. As is shown, the bail 108 in the upper module can be rotated to an unlatched position so as to permit extraction of that module or the cable of an adjacent module. The bottom module remains in the latched position, and neither it or the cable (not shown) within its receptacle is disturbed by the extraction of the upper module.

The following description of alternative exemplary embodiments, shown generally in FIGS. 5-8, focuses on the various features and enhancements of the optical transceiver module that differ from, or are in addition to those already discussed in connection with the embodiment described in FIGS. 1-4. As such, only selected differences between the embodiments will be discussed below, and a description of many of the common components will not be repeated here. Although for ease of illustration the following description focuses on a transceiver module for use in various fiber optic applications, the concepts discussed are also applicable to other pluggable module implementations that may be employed in a variety of other applications.

Figure 5:
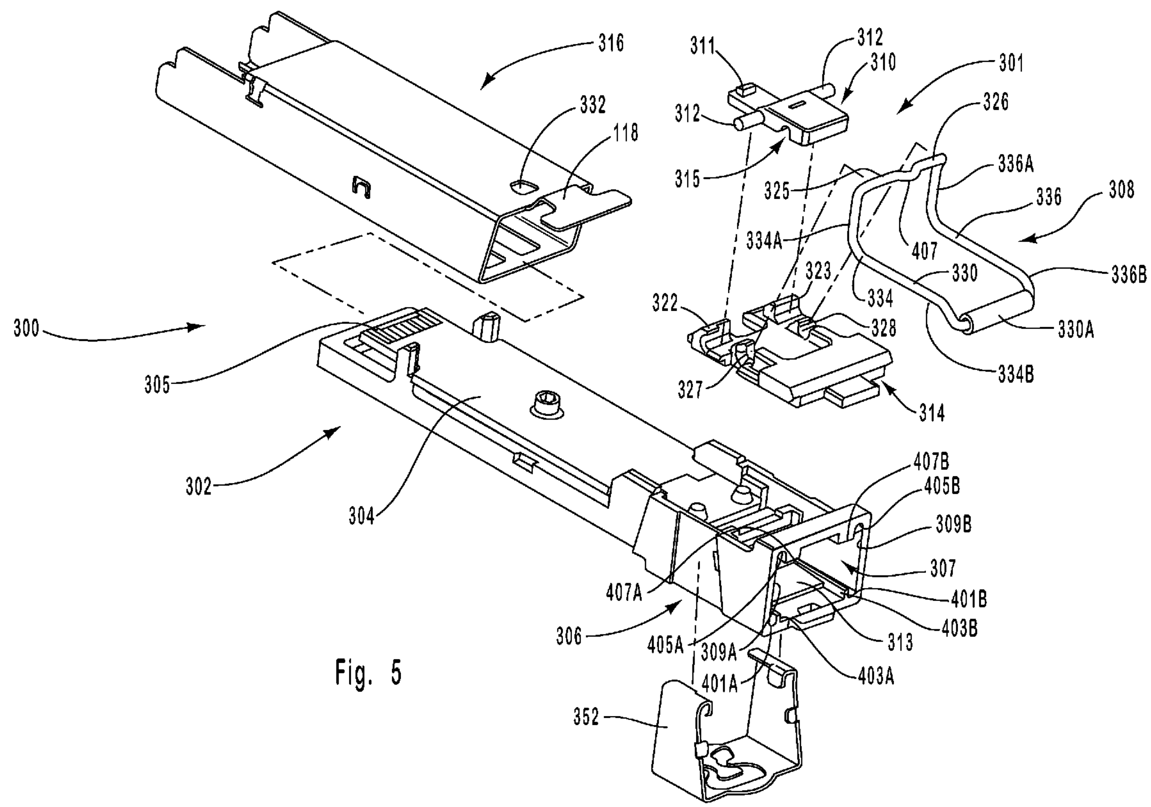
FIG. 5 is an exploded perspective view of another exemplary embodiment of a transceiver module having an integrated latch system.
Figure 6:
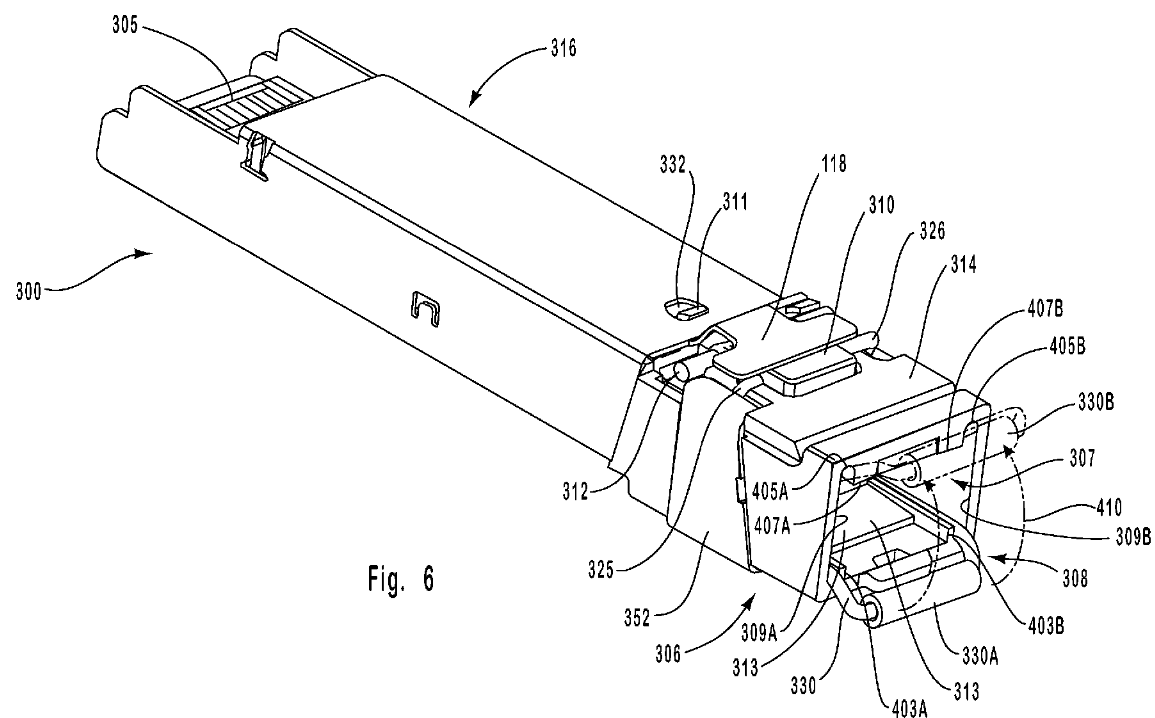
FIG. 6 is a perspective view of an assembled version of the transceiver module and latch system shown in FIG. 5.

Reference will next be made to FIGS. 5 and 6, which together depict another alternative embodiment of a transceiver module, designated generally at 300. Transceiver module 300 can be any type of electronic/optoelectronic module currently in use. As will be discussed, the embodiment illustrated in these figures includes various modifications to the latching mechanism as described in the previous embodiment. As before, the latching mechanism includes a user accessible means for selectively latching the module 300 within a host port. However, in the present embodiment, the user accessible means is a bail, designated generally at 308, that is configured and positioned so as to be substantially disposed within a cavity that forms the connector receptacle portion of the module.

Moreover, as is best seen in FIG. 6, the bail 308 remains substantially positioned within this cavity, even as it is selectively rotated from the latched to the unlatched positions. This feature further prevents the bail from inadvertently contacting other objects, such as adjacent modules, cables, etc., when it is disposed in either the latched or unlatched position, or during its operation. Additionally, this embodiment still allows for a module 300 having a low profile form factor. Further, the overall outer profile and periphery of the module 300 is substantially contiguous and devoid of discontinuous surfaces. Again, this increases the ease by which the module can be inserted and retracted from a port. Significantly, the module 300 provides these features and advantages while still substantially conforming to the SFP Transceiver MSA guidelines. Alternatively, the configuration could be used with other module standards as well.

With continued reference to FIGS. 5 and 6, module 300 generally includes an outer housing 316, an elongate base portion 302, a printed circuit board 304, and a latching mechanism 301 that includes a bail 308. The outer housing 316 is substantially identical to the housing 116 discussed in the previous preferred embodiment. Also as before, the base portion 302 is configured to support and retain the printed circuit board 304, which has disposed on its rear end an edge connector 305.

A connector portion 306 is positioned at the front end of the base portion 302. The connector portion 306 partially defines a cavity, generally designated at 307, that forms a receptacle 313 that is sized and shaped to operably interface with an optical fiber cable connector. Again, the receptacle 313 could be implemented so as to accommodate any one of a number of different connector configurations, depending on the particular application involved. Examples include, but are not limited to, a Fiber Channel connector and an Infiniband connector. The connector portion 306 may be implemented as a separate piece that is attached to the base portion, or it may be formed integrally with the base portion 302.

In addition to defining the receptacle 313, the cavity 307 accommodates the bail 308 in a manner so that a substantial portion of the bail 308 is operatively disposed within the module. For example, in the exemplary embodiment, the cavity 307 includes side surfaces 309A and 309B. The distance between the side surfaces 309A, 309B define a width that is able to accommodate an optical fiber cable connector (or other cable connector, depending on the application involved) in the receptacle portion 313, and at the same time, accommodate the bail 308. Also, as is shown in FIGS. 5 and 6, the arms 334, 336 of the bail 308 rest within retention slots—401A and 401B along the bottom of the cavity, and 405A and 405B along the top of the cavity 307—when the bail is in a latched or an unlatched position. These retention slots are formed by providing a space between the respective side walls 309A and 309B, and ridges formed along the bottom (403A and 403B) and top (407A and 407B) of the cavity 307. The retention slots ensure a separation between the bail and the received cable connector, and also provide a level of structural stability to the bail within the cavity when it is in a latched or unlatched position.

In the illustrated embodiment of FIGS. 5 and 6, the latching mechanism 301 generally includes a pivot block 310, a mounting plate 314, and the bail 308. In the embodiment shown, the pivot block 310 is substantially similar to the pivot block 110 of the previous embodiment, and includes a pivot pin 311, pivot arms 312, and a pivot recess 315.

The mounting plate 314 includes mounting and pivot components for use in operatively interconnecting the pivot block 310, the bail 308 and the module 300. For example, the mounting plate 314 includes retention slots 327 and 328, as well as pivot points 322 and 323. As is best seen in FIG. 6, the mounting plate 314 is at least partially and operatively attached to the base 302 via a clip 352 that is substantially disposed about the outer surface of the base. Preferably, the outer surface of the clip 352, when mounted to the module, is substantially contiguous with the other portions of the module. This ensures a module periphery that is substantially contiguous and without edges, so that the module is easy to insert within a port. When mounted, the mounting plate 314 is positioned substantially above the receptacle 313. Alternatively, the mounting plate 314 could be integrally formed with the connector portion 306, for example as is shown in the previously described embodiments.

In the illustrated embodiment, the bail 308 is shaped so as to selectively operate substantially within the cavity 307. As previously mentioned, this minimizes the extent to which the bail 308 extends beyond the front of the module 300, thereby protecting the bail from damage or inadvertent contact with other adjacent modules or cables when it is rotated from its latched or unlatched position. In the illustrated embodiment, the bail 308 includes a main body portion 330 preferably formed of a rigid metal wire that includes a cam 407 disposed between shoulder portions 325 and 326, similar to the previous embodiment. The bail 308 also includes a lever grip portion 330A suitable for grasping by a user's finger (or similar implement) when the module 300 is removed from a host port 200. As is shown, while the majority of the bail remains disposed within the cavity 307, the grip portion 330A remains substantially external to the cavity so as to be accessible by a user.

The bail 308 further comprises connecting arms 334 and 336 that extend between the lever portion 330A and each of the shoulders 325 and 326. The connecting arms 334 and 336 enable the cam 307 to operate against the pivot block 310 and rotate it when the lever portion 330A is moved from either the latched or unlatched position. Specific to this embodiment, each connecting arm 334 and 336 is shaped to enable the above rotation while remaining substantially disposed within the cavity 307. As is seen in FIG. 5, the connecting arms 334 and 336 have first segments 334A and 336A, and second segments 334B and 336B that are angled with respect to the first segments. It will be appreciated, of course, that the bail 308 could have differently shaped configurations in order to provide similar functionality. For example, the bail could include only one connecting arm, if desired.

Particular reference is now made to FIG. 6, which shows the module 300 in its assembled configuration. In such a configuration, the shoulder portions 325 and 326 of the bail 308 are operatively disposed within the retention slots 327 and 328 in a manner similar to that described in connection with the previous embodiment. Moreover, the connecting arms 334 and 336 are configured so as to be disposed within the retention slots defined on either side of the cavity 307 when placed in a latched (slots 401A, 401B) and an unlatched (slots 405A, 405B) position. The other components included in the latching mechanism 301 are assembled substantially as described above in the previous embodiment. Further, operation of the latching mechanism 301—aside from the fact that the bail 308 is substantially disposed within the module—is substantially similar to that of the previous embodiments.

The bail 308 is shown in FIG. 6 in its latched position; that is, it is positioned such that the pivot pin 311 is exposed through a locking recess 332 in the outer housing 316 to engage the recess 213 in the host port 200 (FIG. 3A). In this position, the receptacle 313 is able to receive the connector of an optical fiber cable for connection with the module 300. As with the previous embodiment, once a fiber cable is connected to the module 300 via the receptacle 313, the bail 308 is prevented from rotating to its unlatched position.

FIG. 6 also shows in phantom the unlatched position of the bail 308. In this position, as before, the module 300 is able to be retracted from port 200 of the host device 202. To transfer the bail 308 from the latched position to the unlatched position in the illustrated embodiment, the fiber cable connector is removed from the receptacle 313. Then, a user grasps the lever 330A and rotates the bail 308 toward the unlatched position. This force causes the connecting arms 334 and 336 to translate through the slots defined on either side of the cavity 307, which in turn causes the cam to rotate within the pivot recess and rotate the pivot block 310. As already explained, rotation of the pivot block 310 causes the pivot pin 311 to disengage the recess 213 of the host port 200, thereby enabling the module 300 to be removed from the host port.

Note that the movement of the connecting arms 334, 336 and the lever portion 330A of the bail 308 when transferred from the latched position to the unlatched position sweep out an imaginary pie piece-shaped volume, which is partially depicted at phantom lines 410 in FIG. 6. In contrast to the volume 210 swept out by the bail 108 in the previous embodiment as shown in FIG. 3B, a substantial portion of the volume 410 is contained within the cavity 309 defined by the connector portion 306. This is due to the disposition of the bail 308 in the present embodiment substantially within the cavity 307. Significantly, this design enables rotation of the bail 308 from the latched to the unlatched position while protecting a significant portion of the bail within the module 300 such that inadvertent contact between the bail and other objects, such as cables attached to other adjacent modules, is prevented. This, in turn, helps ensure that movement of the bail from either the latched or the unlatched position is unimpeded such that removal of the module from the port of the host device is accomplished at will. Finally, the above functionality is implemented so as to preserve the desired small form factor of the module in accordance with prevailing standards.

II. Embodiments Using a Pivot Lever to Manipulate Latching Mechanism

Reference is now made to FIGS. 7 and 8, which show another alternate exemplary embodiment of the present invention, designated generally as reference numeral 700. As will be discussed, the embodiment illustrated in these figures includes various modifications to the latching mechanism as described in the previous embodiment. As before, the latching mechanism includes a user accessible means for selectively latching the module 700 within a host port. However, in the present embodiment, the bail is not present. Other than the absence of the bail, the principles described above in reference to FIGS. 1-6 are generally applicable to this embodiment.

The user accessible means is a pivot lever, designated generally at 710. Pivot lever 710 is an extension of the pivot block shown in previous embodiments. Extending the length of the pivot lever 710 beyond a front plane of the module 700 allows a user to unlatch the module 700 without the need for the external bail. A user can simply apply slight upward pressure to a leading edge 712 of the pivot lever 710, pivoting the pivot lever 710 about the pivot point 112, to release the locking pin 111.

Pivot point 112 can be placed at other locations. For example, the pivot point 112 can be farther forward or farther towards the rear of the module 700. Alternately, pivot point 112 can be eliminated entirely, and the pivot lever 710 can be a cantilevered portion of the module housing. Such a cantilevered pivot lever 710 would also bias the module 700 in a locked position. As with the embodiment described above, a user need only apply slight downward pressure to the leading edge 712 of the pivot lever 710 to unlatch the module 700, thus making it easy to remove.

Pivot lever 710 is similar in size, external dimensions, and structure to pivot blocks 110 and 310. However, since no bail is needed to actuate pivot lever 710, the underlying structure of FIG. 1A, showing the pivot recess 115, enlarged portion 117, and cam follower surface 119 can be eliminated if desired. The pivot lever 710 functions properly without these structures being present on its underside. Alternately, to save manufacturing time, the pivot recess 115, enlarged portion 117, and cam follower surface 119 can be left in place. This will not affect the function of the pivot lever 710. The lock pin 111 remains on the pivot lever 710, thus allowing the module 700 to be locked in place inside the port 200.

In one exemplary embodiment, the pivot lever 710 is extended to approximately 0.07 of an inch longer than corresponding pivot blocks 110 and 310. This amount of extension allows the pivot lever 710 to be easily manipulated by, for example, the finger of a user or other implement, while avoiding the possibility of inadvertent release. One advantage of this embodiment is that it prevents inadvertent release of the module 700 when a fiber optic cable is inserted into the module 700, since a user would be unable to insert a finger under the pivot lever 710 to lift it up when a fiber optic cable is present. Additionally, this amount of an extension allows the module 700 to be easily removed from a port. A user need only release the locking mechanism, grasp the lever, and gently slide the module 700 out of the port. One skilled in the art will realize that smaller or larger extensions are possible. Such smaller and larger extensions are contemplated as being within the scope of the present invention.

According to one embodiment of the module of FIGS. 7 and 8, the movable pivot lever, when moved during disengagement of the module from within the host port, does not extend below a bottom plane defined by a bottom surface of the outer housing 116 of the module. In FIG. 8, this bottom surface of the outer housing 116 is the surface opposite the top side of the module where lock pin 111 engages with recess 213 formed within the host port. This allows the latching mechanism to be employed without increasing the profile of the module and without interfering with other components or structures that might be vertically adjacent to the module when the module is used in a host device.

Since the bail is not present, it cannot inadvertently contact other objects, such as adjacent modules, cables, etc. Additionally, this embodiment still allows for a module 700 having a low profile form factor. Further, the overall outer profile and periphery of the module 700 is substantially contiguous and devoid of discontinuous surfaces. Again, this increases the ease by which the module can be inserted and retracted from a port. Significantly, the module 700 provides these features and advantages while still substantially conforming to the SFP Transceiver MSA guidelines. Alternatively, the configuration can be used with other module standards as well, to include electronic modules instead of optoelectronic modules.

III. Embodiments Using a Bail to Manipulate a Connector Detachment Mechanism Reference is now made to FIGS. 9 and 10, which disclose the interaction between an example of a transceiver module 900 and an associated hooded cable connector 950. In particular, FIGS. 9 and 10 disclose how a latching mechanism of the transceiver module 900 interacts with the hooded cable connector 950 to assist in the disconnection of the hooded cable connector 950 from the transceiver module 900.

In this example embodiment, the transceiver module 900 is an electrical transceiver module which can be inserted into an optical slot of a host device. The transceiver module 900 enables an optical Ethernet port (1000 Base-X) to be converted into a copper Ethernet port (1000 Base-T). Similar to other example transceiver modules disclosed herein, the transceiver module 900 substantially conforms to the SFP Transceiver MSA guidelines. The scope of the invention is not limited to electrical SFP transceiver modules, but extends to optical or electrical transceiver modules having a form factor other than the form factor specified in the SFP Transceiver MSA.

The transceiver module 900 also includes a latching mechanism, at least one embodiment of which is substantially identical in both form and function to the latching mechanism 301 of FIG. 5. The latching mechanism (not shown) of transceiver module 900 of FIG. 9 includes a bail 902 similar to the bail 308 of FIGS. 5 and 6. The bail 902 includes a grip portion 904 similar to the grip portion 330A of FIGS. 5 and 6. The bail 902 is shaped and positioned to be partially disposed within a connector receptacle 906 that is defined in a connector portion of the transceiver module 900, designated generally at 907. The bail 902 is also shaped and positioned to partially extend outward from the connector receptacle 906.

In general, the bail 902 interacts with the other components of the latching mechanism of the transceiver module 900 in a similar manner as the bail 308 interacts with the other components of the latching mechanism 301 disclosed in FIGS. 5 and 6. For example, the bail 902 can also be moved between an unlatched position 908 and a latched position 910. This movement is represented by phantom line 912 in FIG. 9. Once the bail 902 is in the latched position 910, a cable connector, such as the hooded cable connector 950 for example, can be plugged into the connector receptacle 906. The bail 902 is shaped and positioned such that when a cable connector is plugged into the connector receptacle 906, the bail 902 can not be moved between the latched position 910 and the unlatched position 908.

In one example embodiment, the connector receptacle 906 of FIG. 9 is configured as a Registered Jack 45 ("RJ-45") connector receptacle. The example connector receptacle 906 includes electrical contacts 914 which are sized and positioned to make electrical contact with corresponding electrical contacts of an RJ-45 plug when the RJ-45 plug is inserted into the connector receptacle 906. The connector receptacle 906 also includes prongs 916 which are sized and configured to engage with a corresponding detachment clip of an RJ-45 plug when the RJ-45 is inserted into the connector receptacle 906. The scope of the invention is not limited to RJ-45 connector receptacles, but extends to other receptacles capable of receiving a hooded plug with a detachment mechanism similar to the detachment clip of an RJ-45 plug.

With continued attention to FIGS. 9 and 10, details are now provided concerning an example embodiment of a cable connector configured to interface with the connector receptacle 906. In particular, a hooded cable connector 950 is disclosed that includes a cable 952. The hooded cable connector 950 also includes a plug 954. The plug 954 is configured as an RJ-45 plug in this example embodiment and is sized and configured to be plugged into an RJ-45 connector receptacle, such as the connector receptacle 906. The plug 954 includes a detachment clip 956. The detachment clip 956 includes shoulders 958 which are configured to engage the prongs 916 of an RJ-45 connector receptacle when the plug 954 is inserted into the RJ-45 connector receptacle. The plug 954 also includes electrical contacts 960 which correspond to, and are sized and positioned to make electrical contact with, the electrical contacts of an RJ-45 connector receptacle when the plug 954 is inserted into the RJ-45 connector receptacle. The hooded cable connector 950 also includes a hood 962 which partially encloses the detachment clip 956. The hood 962 prevents the detachment clip 956 from inadvertently snagging and becoming damaged during detachment of the hooded cable connector 950 from an RJ-45 connector receptacle.

With particular reference now to FIG. 10, the interaction between the bail 902, the hood 962, and the detachment clip 956 is disclosed. In particular, FIG. 10 discloses how the bail 902 functions as a transfer mechanism to assist in the detachment of the hooded cable connector 950 from the transceiver module 900. In particular, when the plug 954 of the hooded cable connector 950 is positioned within the connector receptacle 906, the shoulders 958 of the detachment clip 956 engage the prongs 916 of the connector receptacle 906 thus preventing removal of the hooded cable connector 950 from the transceiver module 900 until the detachment clip 956 is depressed sufficiently to disengage the shoulders 958 from the prongs 916. A semi-rigid pivot point 964 biases the shoulders 958 of the detachment clip 956 upward so that the shoulders 958 remain firmly engaged with the prongs 916 of the connector receptacle 906. At the same time, the bail 902 extends out of the connector receptacle so as to be positioned between the hood 962 and the detachment clip 956. As disclosed in FIG. 10, the grip portion 904 of the bail 902 is positioned between the hood 962 and the detachment clip 956.

A more particular disclosure of the operation the integrated connector detachment mechanism of the transceiver module 900 will now be given. In order for the hooded cable connector 950 to be disconnected from the transceiver module 900, a sufficient force F must be applied to the hood 962 to disengage the shoulders 958 of the detachment clip 956 from the prongs 916 of the connector receptacle 906. For example, by pressing down with a thumb or finger on the hood 962, this force F can be applied to the hood 962. In at least some embodiments, the hood 962 is made of a semi-flexible material, such as rubber or plastic. The hood 962 is at least semi-resilient and therefore requires some effort in order to deform the hood 962 sufficiently so as to disengage the shoulders 958 of the detachment clip 956 from the prongs 916 of the connector receptacle 906.

In operation, application of the force F against the hood 962 is sufficient to temporarily deform the hood 962 such that the hood 962 is flexed downward until the hood 962 makes contact with the grip portion 904 of the bail 902. The force F is then transferred from the bail 902 to the detachment clip 956. The downward force F applied to the detachment clip 956 by way of the grip portion 904 of the bail 902 causes the detachment clip 956 to rotate downward about the pivot point 964. The bail 902 thus acts as a transfer mechanism for the force F being applied to the hood 962. If the force F is sufficient, the detachment clip 956 is rotated about the pivot point 964 to a position 966 where the shoulders 958 of the detachment clip 956 no longer engage the prongs 916 of the connector receptacle 906, at which point the hooded cable connector 950 can be disconnected from the transceiver module 900.

The size and positioning of the bail 902 enables the hooded cable connector 950 to be disconnected from the transceiver module 900 with less effort than where the bail 902 is absent. Specifically, the downward distance that the hood 962 must be depressed in order to disengage the shoulders 958 of the detachment clip 956 from the prongs 916 of the connector receptacle 906 is decreased by the diameter ("D") of the grip portion 904 of the bail 902. The decreased distance that the hood must be depressed requires less effort than it would take to depress the hood 962 the total distance ("TD") that would be required absent the presence of the bail 902. The decreased downward distance that the hood 962 must be depressed due to the presence of the bail 902 can also result in quicker disengagement of the cable connector 950 from the transceiver module.

The function of the bail 902 can be accomplished by a pivot lever similar to pivot lever 712 of FIG. 7. Likewise, any component that extends between the detachment clip and the hood of a hooded cable connector can function similar to the bail 902 in assisting in the detachment of the hooded cable connector from the transceiver module. In addition, where the thickness of the component that extends between the detachment clip and the hood is increased, the downward distance that the hood must be depressed is correspondingly decreased. Similarly, as the thickness of the hood is increased, the downward distance that the hood must be depressed is correspondingly decreased.

To summarize, embodiments of the present invention provide a number of advantages over existing pluggable electronic module designs. The disclosed electronic module utilizes a unique latching mechanism that allows the module to be easily extracted from a host port—even in environments having a high port density. In particular, the latching mechanism allows a module to be retrieved from a port without the need for specialized extraction tools, and in a manner that does not disturb adjacent modules and/or adjacent fiber cables. Moreover, when a cable connector is operatively received within the port's receptacle, the latching mechanism insures that the module is latched within the port, and is not extracted by inadvertently pulling on the plug or cable. Furthermore, the latching mechanism assists in the disconnection of a hooded cable connector from the module. Finally, the latching mechanism is implemented in a manner so as to preserve the overall low profile presented by the module, as is required by existing industry standards.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A transceiver module comprising:

a housing;

a connector receptacle at least partially disposed within the housing, the connector receptacle configured to receive a cable connector having a hood which partially encloses a detachment clip of the cable connector; and a transfer mechanism connected to the housing and disposed such that when the cable connector is received within the connector receptacle, at least a portion of the transfer mechanism extends between the hood and the detachment clip of the cable connector.

2. The transceiver module as recited in claim 1, wherein the transceiver module substantially complies with the SFP Transceiver MSA.

3. The transceiver module as recited in claim 1, wherein a portion of the transfer mechanism is disposed within the connector receptacle.

4. The transceiver module as recited in claim 1, wherein the transfer mechanism comprises a bail.

5. The transceiver module as recited in claim 4, wherein the bail comprises wire.

6. The transceiver module as recited in claim 4, wherein the bail further comprises a grip portion.

7. The transceiver module as recited in claim 6, wherein the grip portion of the bail is disposed such that when the cable connector is received within the connector receptacle, the grip portion of the bail extends between the hood and the detachment clip of the hooded cable connector.

8. The transceiver module as recited in claim 4, further comprising a locking member operably connected with the bail, the locking member being configured to engage and disengage with a host port.

9. The transceiver module as recited in claim 8, wherein the moveable bail is shaped so as to prevent the disengagement of the locking member from the host port when the cable connector is disposed within the connector receptacle.

10. The transceiver module as recited in claim 8, wherein the locking member is biased into an engaged position with the host port by a resilient member of the housing.

11. The transceiver module as recited in claim 1, wherein the connector receptacle is an RJ-45 connector receptacle.

12. An electrical transceiver module comprising:

a housing;

an electrical connector receptacle at least partially disposed within the housing, the electrical connector receptacle configured to receive an electrical cable connector having a hood which partially encloses a detachment clip of the electrical cable connector; and a bail connected to the housing and disposed such that when the electrical cable connector is received within the electrical connector receptacle, at least a portion of the bail extends between the hood and the detachment clip of the electrical cable connector.

13. The electrical transceiver module as recited in claim 12, wherein the electrical transceiver module substantially complies with the SFP Transceiver MSA.

14. The electrical transceiver module as recited in claim 12, wherein the electrical connector receptacle is an RJ-45 connector receptacle.

15. The electrical transceiver module as recited in claim 12, wherein the bail further comprises a grip portion, wherein, when the electrical cable connector is received within the electrical connector receptacle, the grip portion of the bail extends between the hood and the detachment clip of the cable connector.

16. The electrical transceiver module as recited in claim 12, further comprising a locking member operably connected with the bail, the locking member being configured to engage and disengage with a host port.

17. The electrical transceiver module as recited in claim 16, wherein the moveable bail is shaped so as to prevent the disengagement of the locking member from the host port when the electrical cable connector is disposed within the electrical connector receptacle.

18. The electrical transceiver module as recited in claim 16, wherein the locking member is biased into an engaged position with the host port by a resilient member of the housing.

19. A transceiver module, comprising:

a housing portion;

a connector portion attached to the housing portion and defining a connector receptacle, the connector receptacle configured to removably receive a cable connector having a hood which partially encloses a detachment clip of the cable connector;

a pivot block rotatably engaging the connector portion, the pivot block being rotatable between a first pivot block position where the module is latched to a host port, and a second pivot block position where the module is unlatched from the host port; and a bail secured in position on the connector portion by the pivot block, the bail being operably arranged with respect to the pivot block so that movement of the bail to a first bail position corresponds with a movement of the pivot block to the first pivot block position where the module is latched to the host port, and movement of the bail to a second bail position corresponds with a movement of the pivot block to the second pivot block position where the module is unlatched from the host port, the bail being disposed such that when the cable connector is received within the connector receptacle, at least a portion of the movable bail extends between the hood and the detachment clip of the cable connector.

20. The transceiver module as recited in claim 19, wherein the pivot block includes a pivot arm rotatably engaged with the connector portion.

21. The transceiver module as recited in claim 19, wherein movement of the pivot block by the bail is effected by a cam arrangement.

22. The transceiver module as recited in claim 19, wherein the pivot block is biased into the first pivot block position.

23. The transceiver module as recited in claim 19, wherein the pivot block is positioned on top of the connector portion.

24. The transceiver module as recited in claim 19, wherein the bail is secured in position on top of the connector portion.

25. The transceiver module as recited in claim 19, wherein the bail is rotatably secured in position on the connector portion.

26. The transceiver module as recited in claim 19, wherein the pivot block includes a locking member configured and arranged to selectively engage the host port, so that disposition of the bail in the first bail position corresponds to a state where the locking member is engaged with the host port, and disposition of the bail in the second bail position corresponds to a state where the locking member is disengaged from the host port.

27. The transceiver module as recited in claim 19, wherein when:

the bail is rotated in a counterclockwise direction, the pivot block rotates in a counterclockwise direction; and the bail is rotated in a clockwise direction, the pivot block rotates in a clockwise direction.

* * * * *

UNITED STATES PATENT AND TRADEMARK OFFICE

CERTIFICATE OF CORRECTION

PATENT NO. : 7,314,384 B2
APPLICATION NO. : 11/555121
DATED : January 1, 2008
INVENTOR(S) : Togami et al.

It is certified that error appears in the above-identified patent and that said Letters Patent is hereby corrected as shown below:

Column 3
Lines 45 and 48, change "3-3" to --3A-3A--

Column 7
Line 44, change "though" to --through--

Column 11
Line 25, change "309" to --307--

Column 14
Line 43, change "operation the" to --operation of the--

Signed and Sealed this

Twenty-second Day of December, 2009

David J. Kappos
*Director of the United States Patent and Trademark Office*